(12) United States Patent
Kamiya

(10) Patent No.: US 8,221,234 B2
(45) Date of Patent: Jul. 17, 2012

(54) PORTABLE TERMINAL DEVICE, APPLICATION EXECUTION METHOD THEREOF, PROGRAM, AND COMPUTER-READABLE RECORDING MEDIUM

(75) Inventor: Masaki Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 897 days.

(21) Appl. No.: 11/094,206

(22) Filed: Mar. 31, 2005

(65) Prior Publication Data
US 2005/0221891 A1 Oct. 6, 2005

(30) Foreign Application Priority Data
Apr. 1, 2004 (JP) .................. 2004-109065

(51) Int. Cl.
*A63F 9/24* (2006.01)
*A63F 13/00* (2006.01)
*G06F 17/00* (2006.01)
*G06F 19/00* (2011.01)

(52) U.S. Cl. .......................... 463/30; 463/31
(58) Field of Classification Search .................. 463/30, 463/31
See application file for complete search history.

(56) References Cited

U.S. PATENT DOCUMENTS

| | | | |
|---|---|---|---|
| 4,766,541 A * | 8/1988 | Bleich et al. | 463/31 |
| 4,799,677 A * | 1/1989 | Frederiksen | 463/43 |
| 5,055,919 A * | 10/1991 | Klein et al. | 382/238 |
| 5,519,439 A * | 5/1996 | Keith | 375/240.01 |
| 5,890,175 A | 3/1999 | Wong et al. | |
| 6,028,604 A * | 2/2000 | Matthews et al. | 715/821 |
| 6,134,568 A * | 10/2000 | Tonkin | 715/526 |
| 6,522,342 B1 * | 2/2003 | Gagnon et al. | 715/716 |
| 6,662,226 B1 | 12/2003 | Wang et al. | |
| 6,983,415 B2 * | 1/2006 | Shima | 715/501.1 |
| 2002/0112237 A1 * | 8/2002 | Kelts | 725/39 |
| 2002/0143805 A1 * | 10/2002 | Hayes et al. | 707/500 |
| 2002/0178446 A1 * | 11/2002 | Sie et al. | 725/32 |
| 2003/0117440 A1 | 6/2003 | Hellyar et al. | |
| 2003/0159143 A1 * | 8/2003 | Chan | 725/41 |
| 2003/0167903 A1 * | 9/2003 | Funaki | 84/477 R |
| 2003/0181242 A1 * | 9/2003 | Lee et al. | 463/42 |

(Continued)

FOREIGN PATENT DOCUMENTS
CN 1418360 A 5/2003
(Continued)

OTHER PUBLICATIONS

Chinese Office Action dated Oct. 20, 2006, with English translation.
(Continued)

*Primary Examiner* — Dmitry Suhol
*Assistant Examiner* — Kevin Y Kim
(74) *Attorney, Agent, or Firm* — McGinn IP Law Group, PLLC

(57) ABSTRACT

In a portable terminal device capable of downloading an application, a picture screen of the application is displayed on a display unit without starting the application. To this end, the picture screen of the application is registered as picture data during execution of the application and stored in an application picture area due to an operation of a user. Such a picture screen is read out of the application picture area to be displayed on the display unit. The displayed picture screen serves to confirm a content of the application.

20 Claims, 5 Drawing Sheets

U.S. PATENT DOCUMENTS

2004/0137987 A1* 7/2004 Nguyen et al. .................. 463/42
2004/0183824 A1* 9/2004 Benson et al. ................ 345/719

FOREIGN PATENT DOCUMENTS

| | | |
|---|---|---|
| JP | 07-200611 | 8/1995 |
| JP | 2003-196638 | 7/2003 |
| JP | 2003-223325 | 8/2003 |
| JP | 2003-244652 | 8/2003 |
| WO | WO 02/23317 A2 | 3/2002 |
| WO | WO 03/075547 A2 | 9/2003 |

OTHER PUBLICATIONS

Japanese Office Action dated Jun. 23, 2010 (with partial English translation).

Japanese Office Action dated Sep. 8, 2010 (with partial English translation).

* cited by examiner

PORTABLE TERMINAL DEVICE, APPLICATION EXECUTION METHOD THEREOF, PROGRAM, AND COMPUTER-READABLE RECORDING MEDIUM

This application claims priority to prior Japanese patent application JP 2004-109065, the disclosure of which is incorporated herein by reference.

BACKGROUND OF THE INVENTION

1. Field of Invention

This invention relates to a portable terminal device, an application execution method, a program, and a computer-readable recording medium.

2. Related Art

In general, a portable terminal device of the type described may include a mobile phone (cell phone), a portable digital assistance, or the like and is often equipped with a communication device communicable with a server through an internet. With this structure, the portable terminal device can download a desirable software program, such as a game program and/or the like, from the server, if the server can deliver software program or programs to each portable terminal device.

Conventionally, disclosure has been made in Japanese Unexamined Patent Publication No. 2003-223325 (simply called Reference hereinafter) about a portable terminal device, such as a mobile phone, which can download an application from a server or a program source. Specifically, the download application is stored in a download application storage in Reference. In addition, a menu screen image that is common to both the pre-install and the download applications is displayed on a display unit of the portable terminal device together with keys assigned to the pre-install and the download applications. With this structure, it is possible to distinguish between pre-install applications and download applications by using the common menu screen image on the display unit, together with the respective keys. To this end, a relationship among the download applications, the respective keys, and the menu screen image is stored in a setup value memory portion. Thus, the menu screen image that is common to the install and the download applications is displayed in Reference on the display unit when either one of the download applications is selected by a user.

Each of the download applications might be distinguished from one another by confirming management information that would be displayed on the display unit and that is representative of a name of the download application, it size, and its download date.

However, it becomes difficult to confirm or distinguish each of the download applications from one another by seeing the name, its size, and date alone as the download applications increase in number. Specifically, a user can not often know at a glance how each download application is started.

SUMMARY OF THE INVENTION

It is an object of this invention to provide a portable terminal device which can readily distinguish each download application from others before each download application is started or operated.

It is another object of this invention to provide a method of visually distinguishing each download program from the others before each download program is executed.

It is still another object of this invention to provide a program and a computer readable recording medium both of which are used in the portable terminal device to distinguish among the download programs.

Now, the inventors have found out that difficulty of distinction among the download applications result from the fact that the download applications are distinguished only by character information representative of the name of the download application, its size, and date. Taking the above into consideration, a picture screen is extracted in this invention from the download application and stored in a portable terminal device to be read out when the download application is selected. Such a picture screen is effective to visually distinguish or specify the download application from others.

More specifically, a portable terminal device according to a first aspect of this invention has a display unit and is capable of downloading an application. The portable terminal device comprises processing means for processing the application to execute the application, to extract a picture screen related to the application, and to visually display the picture screen on the display unit without starting the application and storing means for storing the picture screen to deliver the same to the display unit.

According to a second aspect of this invention, the picture screen is sent to the display unit without starting the application.

According to a third aspect of this invention, the storing means comprises a first memory for memorizing the application and the picture screen and a second memory for temporarily storing the picture screen which is delivered to the display unit under control of the processing means.

According to a fourth aspect of this invention, the processing means comprises application executing means for executing the application downloaded in the portable terminal device, picture extracting means for extracting the picture screen during executing the application, and picture sending means for sending the picture screen extracted, to the first memory.

According to a fifth aspect of this invention, the processing means further comprises compressing means for compressing picture screen information that is related to the application and that is acquired from the second memory, to store compressed picture data as the picture screen in the first memory and expanding means for expanding the compressed picture data obtained from the first memory into expanded picture screen information that is stored in the second memory as the picture screen.

According to a six aspect of this invention, the first memory has a management area for storing management information of the application, an application area for storing the application, and a picture area for storing the picture screen data as the picture screen.

According to a seventh aspect of this invention, a method is for use in executing, in a portable terminal device, an application downloaded from a server. The method comprises a first step of extracting a picture screen from the application downloaded, a second step of storing the picture screen in a first memory unit, and a third step of visually displaying the picture screen on the display unit.

According to an eighth aspect of this invention, the second step comprises the steps of receiving the extracted picture screen as picture screen information, storing the picture screen information in a second memory unit (VRAM), compressing the picture screen information into compressed picture screen data, and registering, as the picture screen, the compressed picture screen data in the first memory unit.

According to a ninth aspect of this invention, the third step comprises the steps of expanding the compressed picture screen data received from the first memory unit to obtain expanded picture screen data and to store the expanded picture screen data in the second memory unit as the picture screen information and displaying the picture screen information as the picture screen on the display unit.

According to a tenth aspect of this invention, the third step comprises the steps of selecting a registered one of the application stored in the first memory unit, as a selected application, displaying a function menu screen related to the selected application, to select a picture screen displaying function included in the function menu screen, and displaying the picture screen information related to the registered application on the display unit when the picture screen displaying function is selected.

According to an eleventh aspect of this invention, the third step further comprises the step of finishing displaying the picture screen information when a specific key is pushed, to return back to the function menu screen.

According to a twelfth aspect of this invention, the third step comprises the step of displaying an application list of each application that is previously registered and stored in the first memory and which is specified by its name.

According to a thirteenth aspect of this invention, the step of displaying the application list comprises the step of displaying each reduced screen of the picture screen together with its name.

According to a fourteenth aspect of this invention, the step of displaying each reduced screen comprises the step of displaying a painted color screen of a predetermined color or a predetermined fixed screen as each reduced screen when no picture screen is registered in connection with the application.

According to fifteenth aspect of this invention, a program is for use in displaying, on a display unit, a picture screen of an application downloaded in a computer. The program is executed by the computer and comprises the steps of a step of extracting the picture screen from the application, a step of storing the extracted picture screen in a first memory in the form of picture screen data, and a step of displaying, on the display unit, picture screen information from the picture screen data stored in the first memory.

According to a sixteenth aspect of this invention, the step of storing the extracted picture screen comprises the steps of temporarily storing the extracted picture screen in a second memory in the form of picture screen information, compressing the picture screen information into compressed picture screen data, and storing the compressed picture screen data into the first memory as the picture screen data.

According to a seventeenth aspect of this invention, the step of displaying the picture screen information comprises the steps of selecting the picture screen data stored in the first memory, expanding the picture screen data into expanded picture screen information, storing the expanded picture screen information into a second memory, and displaying, on the display unit, the expanded picture screen information as the picture screen of the application downloaded.

According to an eighteenth aspect of this invention, a computer-readable storage medium records the program mentioned above.

According to a nineteenth aspect of this invention, the computer-readable storage medium may be formed by a recording medium selected from a group consisting of a compact disk, a flexible disk, a hard disk, a magnetic optical disk, a digital versatile disk, a magnetic tape, and a semiconductor memory.

DESCRIPTION OF THE PREFERRED EMBODIMENTS

Figure 1:
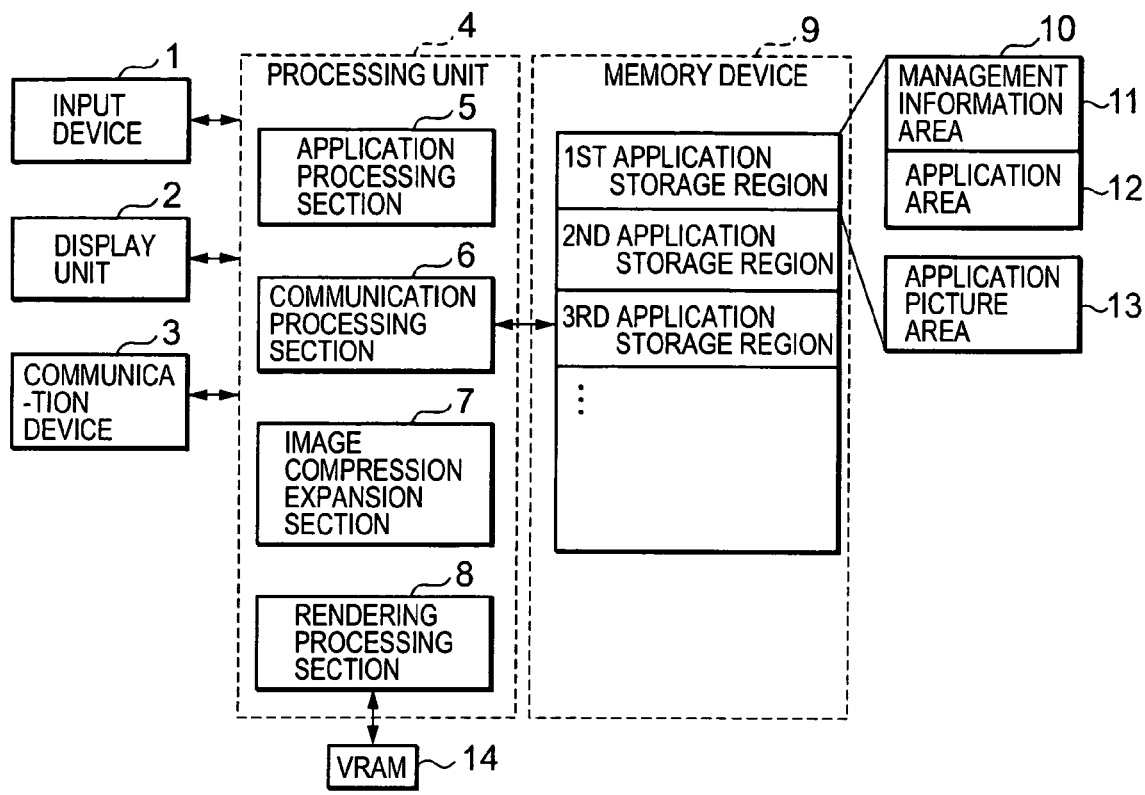
FIG. 1 shows a block diagram of a portable terminal device according to an embodiment of this invention.

Referring to FIG. 1, a portable terminal device according to an embodiment of this invention is specified by a mobile phone (cell phone) and has an input device 1, such as a key board, and a display unit 2 which is operable as an output device and which may be formed, for example, by a liquid crystal display (LCD). In addition, the illustrated portable terminal device further has a communication device 3 communicable with a server or servers (not shown) through a radio channel. Therefore, the portable terminal device is capable of downloading an application from each server. Herein, it is to be noted in the instant specification that the application may be a combination of a program composed of a sequence of instructions and data used in the program. In addition, the program may be stored in a recording medium, such as a compact disk, a flexible disk, a hard disk, a magnetic optical disk, a digital versatile disk, a magnetic tape, and a semiconductor memory.

The input device 1, the display unit 2, and the communication device 3 are connected to a processing unit 4 and are controlled by the processing unit 4 in a manner to be described later. Furthermore, the processing unit 4 cooperates with a memory device 9 and a video random access memory (VRAM) 14 in the illustrated example.

Specifically, the processing unit 4 includes an application processing section 5 for carrying out an application control operation and a communication processing section 6 for carrying out a communication control operation. Herein, the application control operation may be, for example, registration and/or execution of an application while the communication control operation may be, for example, an operation of downloading an application or the like. Furthermore, the processing unit 4 shown in FIG. 1 has an image compression/expansion section 7 for compressing/expanding an input data sequence as an image or picture and a rendering or drawing processing section 8 for writing data displayed on the display unit 2, into the VRAM 14 or reading data out of the VRAM 14. Each of the application processing section 5, the communication processing section 6, the image compression/expansion processing section 7, and the rendering processing section 8 may be realized by a software program and may be recognized as a part of the program.

The memory device 9 has a plurality of application storage regions 10 (specified only by first through third application storage regions in FIG. 1) each of which serves to store an application downloaded from a server (not shown). In the illustrated example, each application storage region 10 is divided into a management information area 11 for storing a name of the application downloaded, an address of an application source, and the like, an application area 12 for storing a download application (namely, download program and data) itself, and an application picture screen area 13 for storing, in the form of data, a picture screen appearing before or when the application is executed. For convenience of description, the memory device 9 and the VRAM 14 may be referred to as first and second memories, respectively.

Referring to FIGS. 1 to 6, detailed description will be made about an operation of the portable terminal device according to this invention. An operation of registering a picture or image screen of an application will be described with reference to FIG. 2 that shows a flow chart for describing the registering operation. In this even, the illustrated flow chart may be recognized as the program executed in the processing unit 4.

Figure 2:
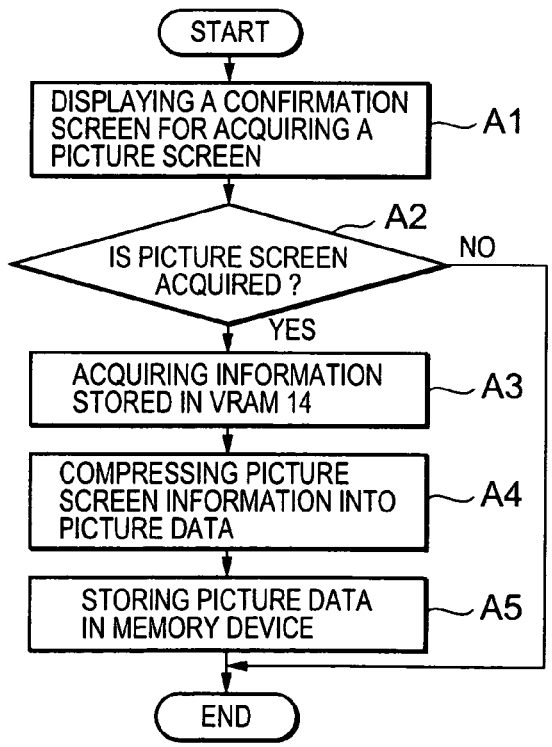
FIG. 2 is a flow chart for use in describing an operation carried out on registering a picture screen of an application.

The registering operation shown in FIG. 2 is started when a specific key (predetermined key) of the input device 1 is depressed or pushed by a user and is thereafter executed under control of the processing unit 4. Specifically, the registering operation is carried out by the application processing section 5 in accordance with the program. Subsequently, a dialog box or window is displayed on the display unit 2 as a confirmation screen for acquiring a picture screen of an application downloaded (Step A1). By the use of the confirmation screen, judgment is made at Step A2 about whether or not the picture screen is acquired.

If no acquisition of the picture screen is selected at Step A2 by the user on the confirmation screen, the registering operation is over and returned back to a prior picture screen of the application.

On the other hand, if the user selects the acquisition of the picture screen at Step A2, the rendering or drawing processing section 8 is energized after Step A2 to execute Step A3 within the processing unit 4. Specifically, the rendering or drawing processing section 8 accesses the VRAM 14 and acquires that information of a picture screen which is stored in the VRAM 14 and that may be called picture screen information.

The picture screen information acquired from the VRAM 14 is delivered from the rendering processing section 8 to the image compression/expansion processing section 7 and is compressed by the image compression/expansion processing section 7 into picture screen data (Step A4). The picture screen data obtained by compressing the picture screen information is stored in the application picture area 13 of the memory device 9 at Step A5 and, thereafter, the prior application picture screen is displayed on the display unit 2. Thus, the registering operation of the picture screen is completed. From this fact, it is readily understood that the picture screen data is attained by compressing the picture screen information received from the communication device 3 and stored in the VRAM 14.

Figure 3:
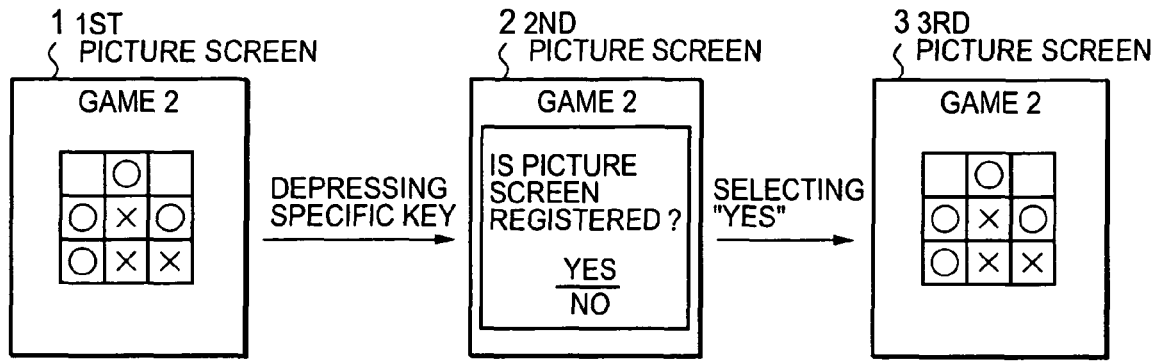
FIG. 3 exemplifies picture screens appearing on the picture screen registration processing.

The registering operation will be described in detail with reference to FIG. 3. It is assumed in FIG. 3 that an application downloaded (namely, download application) is for playing a game 2 and is being executed by the user by the use of the portable terminal device. At first, a first picture screen is assumed to appear on the display unit 2 during playing the game 2, as shown in the left side of FIG. 3. Under the circumstances, when the specific or predetermined key of the input device 1 is depressed or pushed on the portable terminal device, the application or the game 2 is interrupted and a dialog box as illustrated in the center of FIG. 3 appears as a second picture screen 2 so as to confirm whether or not the first picture screen is to be registered. The second picture screen 2 includes a predetermined message, namely, "Is the picture screen registered? (YES/NO)". If the user selects "Yes" on the second picture screen 2, the registering operation described with reference to FIG. 2 is executed. When the registering operation is finished, the second picture screen 2 is changed to a third picture screen 3 that is shown in the right side of FIG. 3 and that is the same as the first picture screen 1. This shows that processing is returned back to the application and the application is restarted.

Figure 4:
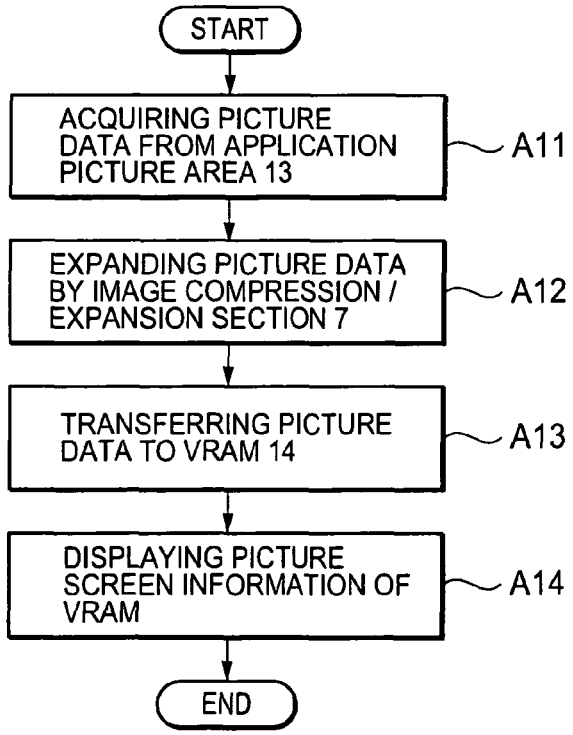
FIG. 4 is a flow chart for use in describing an operation carried out on displaying information related to the picture screen of the application.

Referring to FIG. 4, description will be made about an operation that is carried out in response to user's operation so as to display the picture screen data of the application stored in the memory device 9 as the picture screen information on the display unit 2. At first, let the user select the operation of displaying the picture screen data of the application. In this event, the picture screen data is read out of the application picture area 13 under control of the processing unit 4 and is sent to the image compression/expansion section 7, as shown at Step A11. The picture screen data is expanded by the image compression/expansion section 7 into picture screen information that is delivered to the rendering processing section 8 (Step A12). Thereafter, the picture screen information is transferred from the rendering processing section 8 to the VRAM 14 (Step A13) and is sent to the display unit 2 to be displayed (Step A14).

Figure 5:
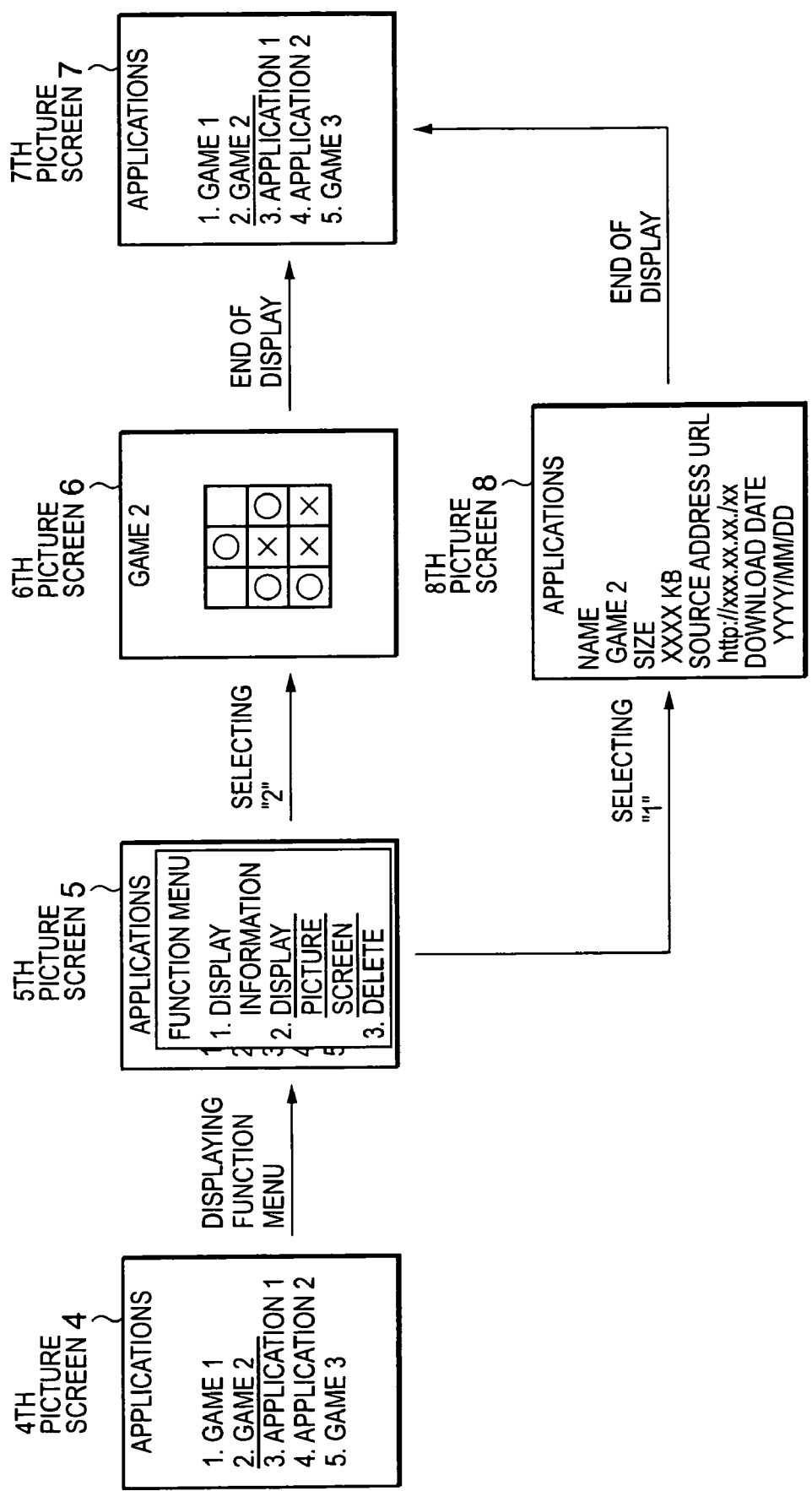
FIG. 5 exemplifies picture screens of picture screen information.

Referring to FIG. 5, description will be made about an example of picture screen information that is displayed on the display unit 2. It is assumed that a fourth picture screen 4 is displayed on the display unit 2 as shown in the leftmost side of FIG. 5. The illustrated fourth picture screen 4 displays an application list of applications which are registered in the portable terminal device and which are composed of games 1 and 2 downloaded from servers and pre-install applications 1 to 3. Thus, both the download and the pre-install applications are displayed on the picture screen 4 in the illustrated example. In FIG. 5, the game 2 is selected as depicted by an under bar in the fourth picture screen 4. Under the circumstances, when the user selects a function menu by depressing a key assigned to the function menu, the fourth picture screen 4 is changed to a fifth picture screen 5 for displaying the function menu. The function menu illustrated in the fifth picture screen 5 lists "1. information display function, 2. picture screen display function, and 3. delete function".

When the user selects "2. picture screen function", processing for the picture screen display function is executed in the processing unit 4 and, as a result, the fifth picture screen 5 is changed to a sixth picture screen 6 which is stored in the application picture area 13 and which is displayed on the display unit 2.

The sixth picture screen 6 is identical with the picture screen of the game 2 illustrated in FIG. 3. From this fact, it is readily understood that the sixth picture screen 6 of the game 2 is displayed as the application picture screen when the game 2 is selected by using the fourth picture screen 4 in FIG. 5. This shows that the user can easily recognize the game 2 from the application picture screen (namely, a picture or an image) even when the user can not recognize the game 2 from its name alone.

When the user depresses the specific key on the input device 1 while the application picture screen is being displayed on the display unit 2, the application picture screen is finished and is returned back to the menu screen which is shown as a seventh picture screen 7 and which is identical with the fourth picture screen 4.

When the user selects the information display function included in the function menu of the fourth picture screen 4, the management information of the game 2 is read out of the management information area 11 and is displayed on the display unit 2, as shown by an eighth picture screen 8 in FIG. 5. The management information includes a software name, such as the game 2, a size of the software, a source address, such as URL (Uniform Resource Locator), and a downloaded date. After displaying the management information is finished, the menu is displayed again, as shown by the seventh picture screen 7.

Figure 6:
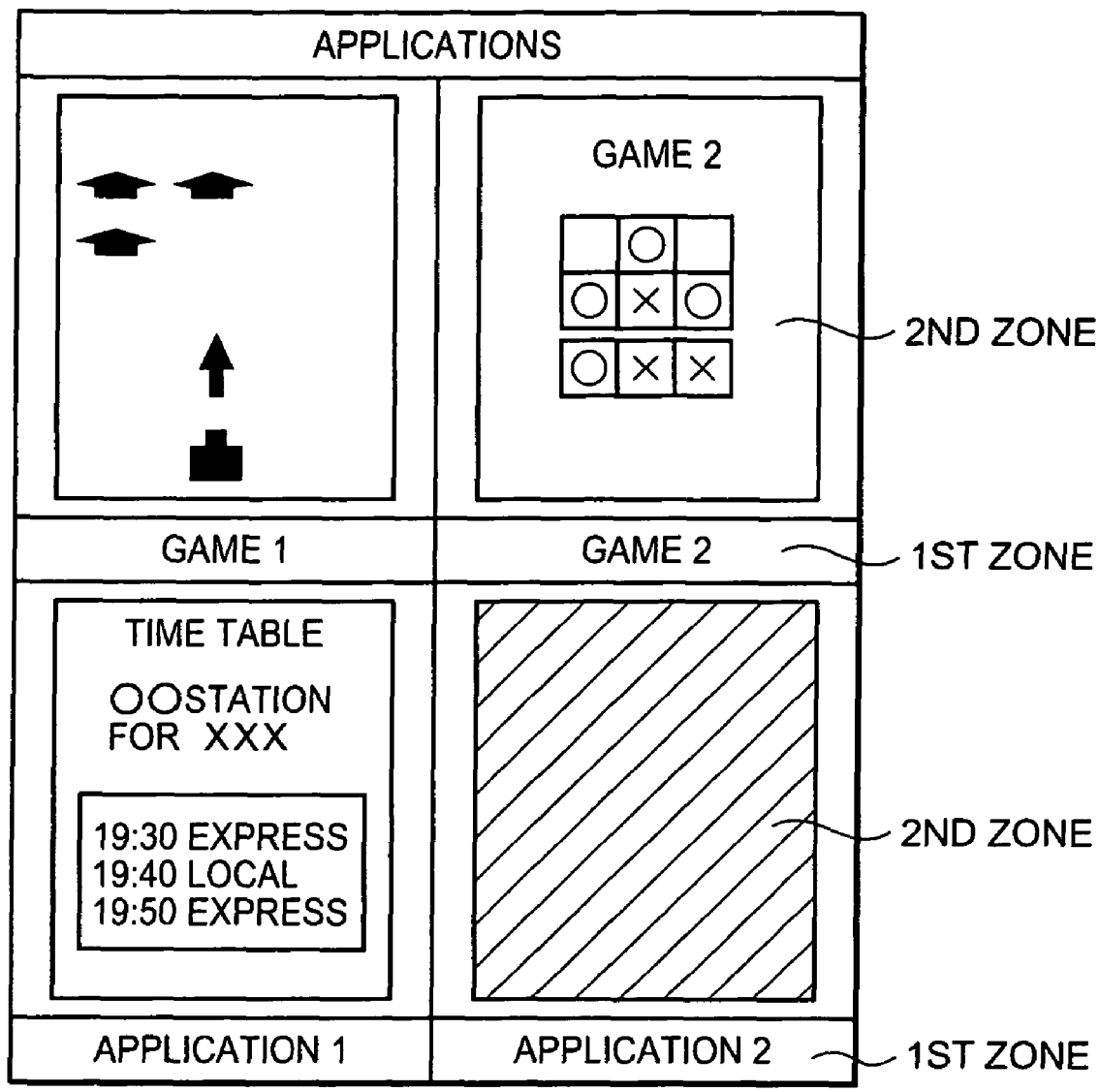
FIG. 6 shows another example for describing another picture screen of an application.

Referring to FIG. 6, description will be made about another application picture screen that shows an application list of applications registered in the portable terminal device. In FIG. 6, four applications are displayed together with their names in a contracted manner within a single screen and are specified by games 1 and 2 and applications 1 and 2 in FIG. 6.

It is assumed that the fourth picture screen 4 illustrated in 5 is at first displayed on the display unit 2 as shown in the leftmost side of FIG. 5. Under the circumstances, when the user selects a function menu by depressing a key assigned to the function menu, the fourth picture screen 4 is changed to a fifth picture screen 5 for displaying the function menu. Although not shown in FIG. 5, the function menu according to this example lists "1. information display function, 2. picture screen display function, 3. thumbnail display function, and 4. delete function". When the user selects "3. thumbnail display function", processing for the picture screen display function is executed in the processing unit 4 and, as a result, the picture screen illustrated in FIG. 6 is displayed on the display unit 2.

In other words, the four picture screens are displayed in the form of thumbnail images and are divided into first zones 1 and second zones 2 determined for the respective picture screens. In the illustrated example, the first zones 1 are for displaying the names of the applications while the second zones 2 are for displaying pictures selected from the respective applications. As shown in the second zone 2 for the application 2, the second zone 2 corresponding to the application 2 is completely painted in color. Instead, a prescribed image or pattern may be displayed in the second zone 1 so as to indicate no storage of any picture screen.

Now, let the game 2 be selected by the user in FIG. 6. Under the circumstances, when the user selects a function menu by depressing the key assigned to the function menu, the thumbnail images picture screen illustrated in FIG. 6 is changed to a sixth picture screen 6 which is stored in the application picture area 13. Since it is identical with the display operation mentioned in connection with the screens 7 to 8 except this, explanation will be omitted below.

At any rate, no picture screen is stored in connection with the application 2 in the illustrated example.

The above-mentioned functions make it possible to extract the picture screen from the application, to store the same in the portable terminal device, and to display the picture screen as picture screen information of the application without starting the application itself. Judging such a picture screen, the user can easily and accurately know the content of the application before the application is started.

Figure 7:
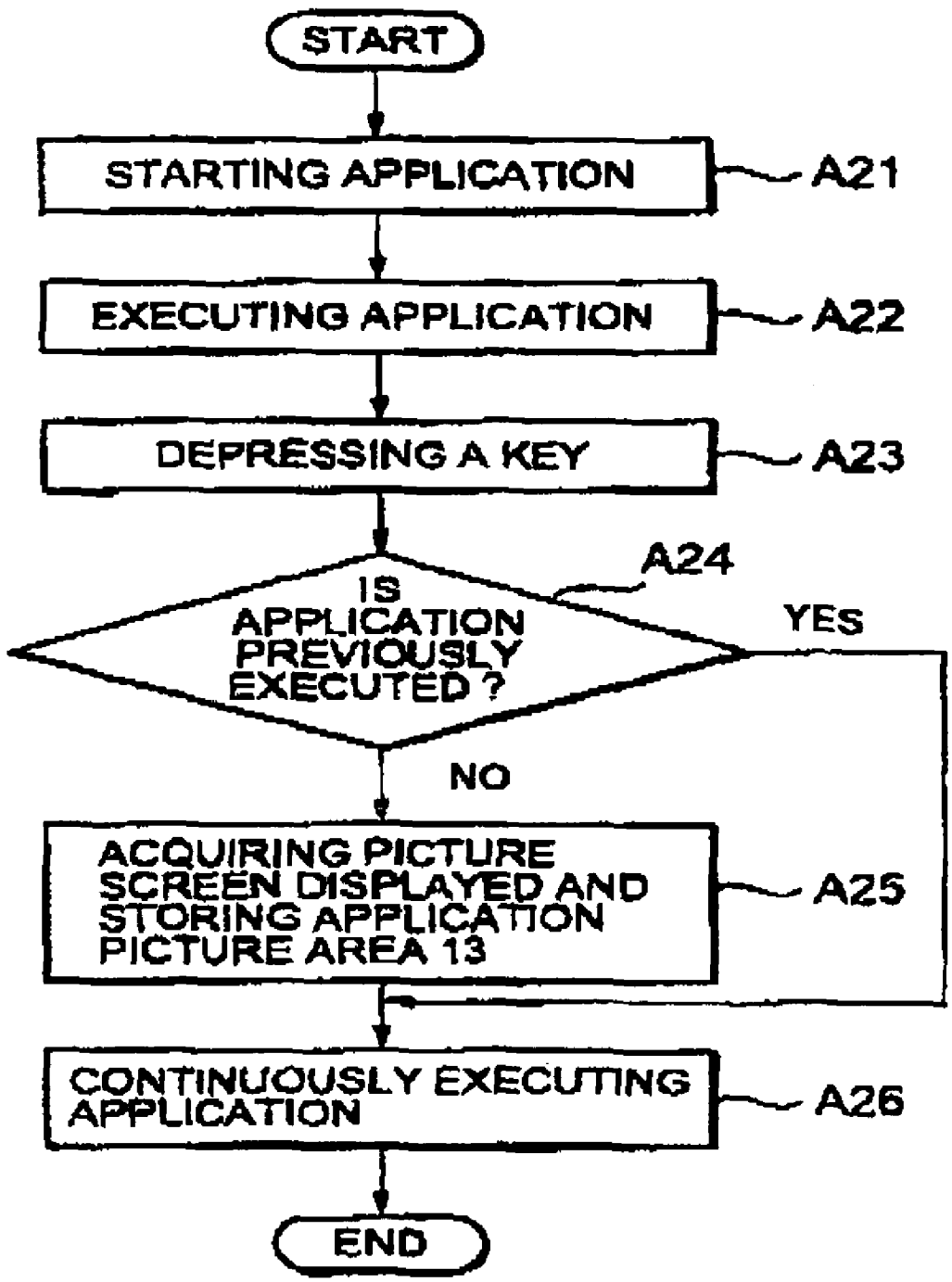
FIG. 7 is a flow chart for use in describing operation carried out when an application is started.

Referring to FIG. 7 in addition to FIG. 1, description will be made about an operation of a portable terminal device according to another embodiment of this invention. The operation of the portable terminal device is carried out in accordance with a flow chart illustrated in FIG. 7. When a user manipulates the portable terminal device and starts an application (Start A21), the application is read out of the application area 13 under control of the application processing section 5 and is executed (Step A22). When the user depresses a predetermined key assigned to the application during execution of the application (Step A23), judgment is made at Step S24 as to whether or not the application in question has been previously executed ever.

If the application in question has already executed, the application can be continuously processed (Step A26). On the other hand, when the application in question is initially started and executed, its picture screen is acquired and stored in the application picture area 13 and is processed to be registered (Step A25). After registration of the picture screen is finished, the application is continuously processed (Step A26).

The above-mentioned operation makes it possible to register the picture screen simultaneously with depressing the predetermined key by the user. With this method, it is possible to register the picture screen of the application even when the user does not intentionally carry out an operation of registering the picture screen.

What is claimed is:

1. A portable terminal device having a display unit and capable of downloading an application, the portable terminal device comprising:
   a key which is operable during execution of the application;
   processing means for processing the application to download the application along with an application name as a downloaded application, to execute the downloaded application, to judge in response to an operation of the key whether the executed downloaded application, is previously executed, to acquire a picture screen of the executed downloaded application only when the executed downloaded application is initially executed, and otherwise, to continue execution of the downloaded application, and to carry out a registering operation of the acquired picture screen on the display unit; and
   registering means for registering, along with the application name, the acquired picture screen of the executed downloaded application,
   wherein the processing means carries out processing to display, on the display unit, a function menu which includes indications of an information display function and a picture screen display function concerned with the acquired picture screen,
   wherein the processing means makes an access to the registering means to display the acquired picture screen on the display unit when the indication of the picture screen display function is selected, and
   wherein the processing means makes the execution of the downloaded application restart after the registration of the acquired picture screen.

2. A portable terminal device as claimed in claim 1, wherein acquired picture screen information is sent to the display unit without starting the downloaded application.

3. A portable terminal device as claimed in claim 1, wherein the portable terminal device further comprises storing means, said storing means comprising:
   a first memory for memorizing the downloaded application and the acquired picture screen; and
   a second memory for temporarily storing the acquired picture screen which is delivered to the display unit under control of the processing means.

4. A portable terminal device as claimed in claim 3, wherein the processing means comprises:
   application executing means for executing the downloaded application in the portable terminal device;
   picture acquiring means for acquiring the acquired picture screen during executing the downloaded application; and picture sending means for sending the acquired picture screen, to the first memory.

5. A portable terminal device as claimed in claim 4, wherein the processing means further comprises:
compressing means for compressing picture screen information that is related to the downloaded application and that is acquired from the second memory, to store compressed picture data as the acquired picture screen in the first memory; and
expanding means for expanding the compressed picture data obtained from the first memory into expanded picture screen information that is stored in the second memory as the acquired picture screen.

6. A portable terminal device as claimed in claim 5, wherein the first memory includes a management area for storing management information of the downloaded application, an application area for storing the downloaded application, and a picture area for storing the picture screen data as the acquired picture screen.

7. A portable terminal device as claimed in claim 1, wherein the application includes other than images.

8. A method of executing, in a portable terminal device, an application downloaded from a server, the method comprising:
downloading the application along with a name of the application as the downloaded application;
judging, in response to an operation of a key, whether the downloaded application was previously executed in the portable terminal device;
acquiring, from the downloaded application, a picture screen of the executed downloaded application only when the downloaded application is initially executed in the portable terminal device and otherwise, continuing execution of the downloaded application;
registering, in a first memory unit, along with the name of the downloaded application, the acquired picture screen of the executed downloaded application;
displaying, on the display unit, a function menu which includes indications of an information display function and a picture screen display function concerned with the acquired picture screen;
displaying the acquired picture screen on the display unit when the indication of the picture screen display function is selected; and
restarting the execution of the downloaded application after the registration of the acquired picture screen.

9. A method as claimed in claim 8, wherein the method further comprises:
receiving the acquired picture screen as picture screen information;
storing the acquired picture screen information in a second memory unit;
compressing the acquired picture screen information into compressed picture screen data; and
registering, as the acquired picture screen, the compressed picture screen data in the first memory unit.

10. A method as claimed in claim 9, wherein the displaying the acquired picture screen comprises:
expanding the compressed picture screen data received from the first memory unit to obtain expanded picture screen data and to store the expanded picture screen data in the second memory unit as the picture screen information; and
displaying the picture screen information as the acquired picture screen on the display unit.

11. A method as claimed in claim 8, wherein the displaying the acquired picture screen comprises:
selecting a registered one of the downloaded application stored in the first memory unit, as a selected application;
displaying a function menu screen related to the selected application, to select a picture screen displaying function included in the function menu screen; and
displaying the picture screen information related to the registered application on the display unit when the picture screen displaying function is selected.

12. A method as claimed in claim 11, wherein the displaying the acquired picture screen further comprises:
finishing displaying the picture screen, information when a specific key is pushed, to return back to the function menu screen.

13. A method as claimed in claim 8, wherein the displaying the acquired picture screen comprises:
displaying an application list of each application that is previously registered and stored in the first memory unit and which is specified by its name.

14. A method as claimed in, claim 13, wherein displaying the application list comprises:
displaying each reduced screen of the acquired picture screen together with its name.

15. A method as claimed in claim 14, wherein displaying each reduced screen comprises:
displaying a painted color screen of a predetermined color or a predetermined fixed screen as each reduced screen when no acquired picture screen is registered in connection with the downloaded application.

16. A computer readable storage medium tangibly encoded with computer readable instructions for a program for use in displaying, on a display unit, a picture screen of an application which is downloaded as a downloaded application along with an application name in a computer, the program being executed by the computer and comprising:
judging, in response to an operation of a key, whether the downloaded application was previously executed in past;
acquiring, from the downloaded application, a picture screen of the executed downloaded application only when the downloaded application is initially executed, and otherwise, continuing execution of the downloaded application;
storing, in a first memory, the acquired picture screen of the executed downloaded application;
displaying, on the display unit, a function menu which includes indications of an information display function and a picture screen display function concerned with the acquired picture screen;
displaying, on the display unit, the acquired picture screen when the indication of the picture screen display function is selected; and
restarting the execution of the downloaded application after the registration of the acquired picture screen.

17. A computer readable medium as claimed in claim 16, wherein further comprising:
temporarily storing the acquired picture screen in a second memory a form of picture screen information;
compressing the acquired picture screen information into compressed picture screen data; and
storing the compressed picture screen data into the first memory as picture screen data.

18. A computer readable medium as claimed in claim 17, wherein the displaying the picture screen information comprises:

selecting the picture screen data stored in the first memory;

expanding the picture screen data into expanded picture screen information;

storing the expanded picture screen information into a second memory; and displaying, on the display unit, the expanded picture screen information as the acquired picture screen of the downloaded application.

19. The computer readable medium as claimed in claim 16, wherein said computer readable medium comprises a recording medium selected from a group consisting of a compact disk, a flexible disk, a hard disk, a magnetic optical disk, digital versatile disk, a magnetic tape, and a semiconductor memory.

20. A portable terminal device having a display unit and capable of downloading an application, the portable terminal device comprising:

a key which is operable during execution of the downloaded application;

a processing unit which processes the application to download the application along with an application name as a downloaded application, to execute the downloaded application, to judge in response to an operation of the key whether the executed downloaded application is previously executed, to acquire a picture screen of the executed downloaded application only when the executed downloaded application is initially executed, and otherwise, to continue execution of the downloaded application, and to carry out a registering operation of the acquired picture screen on the display unit; and a memory device which registers, along with the application name, the acquired picture screen of the executed downloaded application, wherein the processing unit further carries out processing to display, on the display unit, a function menu which includes indications of an information display function and a picture screen display function concerned with the acquired picture screen, wherein the processing unit makes an access to the memory device to display the acquired picture screen on the display unit when the indication of the picture screen display function is selected, and wherein the processing unit makes the execution of the downloaded application restart after the registration of the acquired picture screen.

\* \* \* \* \*